United States Patent [19]

Schöllhorn

[11] Patent Number: 4,634,910
[45] Date of Patent: Jan. 6, 1987

[54] ROTOR OF AN ELECTRICAL MACHINE HAVING A DIRECTLY COOLED ROTOR WINDING

[75] Inventor: Karl Schöllhorn, Birr, Switzerland

[73] Assignee: BBC Brown, Boveri & Company Limited, Baden, Switzerland

[21] Appl. No.: 764,748

[22] Filed: Aug. 12, 1985

[30] Foreign Application Priority Data

Aug. 27, 1984 [CH] Switzerland .................. 4082/84

[51] Int. Cl.⁴ .............................................. H02K 1/32
[52] U.S. Cl. ..................................... 310/214; 310/61; 310/201; 310/254
[58] Field of Search ................... 310/52–54, 310/58–61, 64, 65, 63, 179, 208, 214–216, 218, 261, 270, 201

[56] References Cited

U.S. PATENT DOCUMENTS

| | | | |
|---|---|---|---|
| 2,986,664 | 5/1961 | Willyoung et al. | 310/61 |
| 2,990,486 | 6/1961 | Willyoung | 310/214 |
| 3,119,033 | 1/1964 | Horsley et al | 310/214 |
| 4,010,394 | 3/1977 | Lorch et al. | 310/270 |
| 4,152,610 | 5/1979 | Wallenstein | 310/214 |

FOREIGN PATENT DOCUMENTS 534929 2/1955 Belgium .................. 310/201

*Primary Examiner*—Patrick R. Salce
*Assistant Examiner*—D. L. Rebsch
*Attorney, Agent, or Firm*—Oblon, Fisher, Spivak, McClelland & Maier

[57] ABSTRACT

A rotor of an electrical machine having directly cooled rotor winding, including winding conductors forming a conductor bundle, located one above the other in respective grooves and fastened therein by respective groove wedges, the winding conductors each having at least two adjacent half cooling ducts extending in the longitudinal direction of the conductors. Provided in a central section of the rotor assembly are two gas outlets offset relative to one another in a peripheral direction of the rotor and in which the cooling ducts are interrupted by separating means. At each interruption point, the respective half cooling duct is in connection with a respective radially extending duct, which ends at the surface of the rotor. In order to avoid increases in temperature in the region of the gas outlet, the gas outlets of a conductor bundle are offset retative to one another in the longitudinal direction of the conductors. The radial ducts emerge into holes penetrating the groove wedges approximately radially.

6 Claims, 4 Drawing Figures

ROTOR OF AN ELECTRICAL MACHINE HAVING A DIRECTLY COOLED ROTOR WINDING

BACKGROUND OF THE INVENTION

1. Field of the Invention

This invention relates to a rotor of an electrical machine having a direct gas cooled rotor winding and more particularly this invention relates to a rotor of an electrical machine as described in the article "Luftgekuehlte Turbogeneratoren", published in "ETG-Fachberichte 3-Kraftwerks-Generatoren" VDE-Verlag GmbH-Berlin 1977, pp. 45–54, in particular FIGS. 8 and 10 on p. 52.

2. Discussion of Background

The known directly gas cooled rotor winding consists of individual conductors arranged one above the other, with one or two longitudinal ducts per conductor. The cooling gas enters on both sides underneath the end of the rotor winding and splits into two paths at the beginning of the rotor packet. Part of the gas flows through the winding end conductor and leaves the winding end space through special openings which are located in the pole zone in the rotor packet; the main part of the cooling gas quantity, however, enters the hollow conductors at the beginning of the rotor packet in order to flow out radially in the center of the rotor packet. The gas outlet part is shown in FIG. 10 of the publication mentioned above. It may be seen from this representation that all the conductors of one layer in the center of the rotor have solid intermediate conductor pieces and the two cooling ducts of each conductor position are penetrated at the sides at the connection point with the intermediate conductor pieces. The cooling ducts enter radially outwards extending ducts which are located symmetrically with respect to the longitudinal direction of the conductors. These radial ducts are formed by millings in the solid intermediate conductor pieces lying above each of them nd by the groove closure wedges. Because of the gas supply on both sides, connecting sections of varying length are not so intensively cooled, depending on the position of the conductor in the groove. This causes an additional increase in temperature (hot spot) which finally determines the thermal load limit which can be accepted by the rotor winding.

SUMMARY OF THE INVENTION

Accordingly, one object of this invention is to provide a novel rotor of an electrical machine of the type mentioned initially wherein no substantial increase in temperature occurs in the regions of the gas outlets in the center of the machine.

This object is attained according to the invention by providing a novel rotor for an electrical machine having a directly cooled rotor winding including winding conductors forming a conductor bundle and located one above the other in grooves and fastened therein by means of groove wedges, the winding conductors having at least two adjacent cooling ducts running in the longitudinal direction of the conductors, at least two gas outlets in the central section of the rotor and offset relative to one another in the rotor peripheral direction, in which central section the cooling ducts are interrupted at plural interruption points by separating means. At each interruption point, each half cooling duct is in connection with a respective approximately radially extending duct which ends at the upper surface of the rotor. The gas outlets of a conductor bundle are offset relative to one another in the conductor longitudinal direction and the radial ducts emerge into holes passing approximately radially through the groove wedges.

In this way, sections of the rotor winding in one half of the gas arrival zone are also cooled by the cooling gas flowing through the cooling ducts in the adjacent conductor halves. A further advantage consists in the fact that the penetration/holes in the groove closure wedges are distributed over a longer length, the wedge being weakened to a less extent in consequence.

It is then particularly advantageous if the two gas outlets are immediately adjacent to one another in the conductor's longitudinal direction.

The guidance of cooling gas through holes in the central region of the groove wedge has the advantage that—in contrast to the known type—the wedge flanks can be kept free from recesses and notches. In addition, the wedges are simpler to manufacture.

Apart from those radial ducts which are allocated to the winding conductors located uppermost in the groove, all the radial ducts extend within the winding conductor located above them. In this way, the gases flowing outwards through these ducts also contribute to the cooling of the current carrying conductors in the region of the gas outlet. Otherwise than in the case of the known type, direct cooling can, therefore, also be effected in the region of the gas outlets.

In accordance with a further embodiment of the invention, the radial ducts are formed as insulating tubes which extend radially outwards as far as the groove wedge. The insulating tubes entering into one cooling duct then form the separating means for all the cooling ducts above them and limit them in the axial direction. The internal diameter of the insulating tubes is then preferably so selected that it is equal to or greater than the width of the cooling ducts. The insulating tubes have circular or rectangular cross-sectional shape, the latter permitting the smallest possible restriction of the flow cross-section in the gas outlet.

In a different embodiment of the invention, the radial ducts are formed by holes or penetrations in the winding conductors, the separating means being either designed at the closure pieces filling the total cross-section of the cooling ducts or involving complete restriction of the cooling ducts near the holes.

Both possibilities are particularly suitable for winding conductors which are composed of two section conductors of E-shaped cross-section. In the case of conductors of this type, the separating means can be applied or installed particularly simply.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
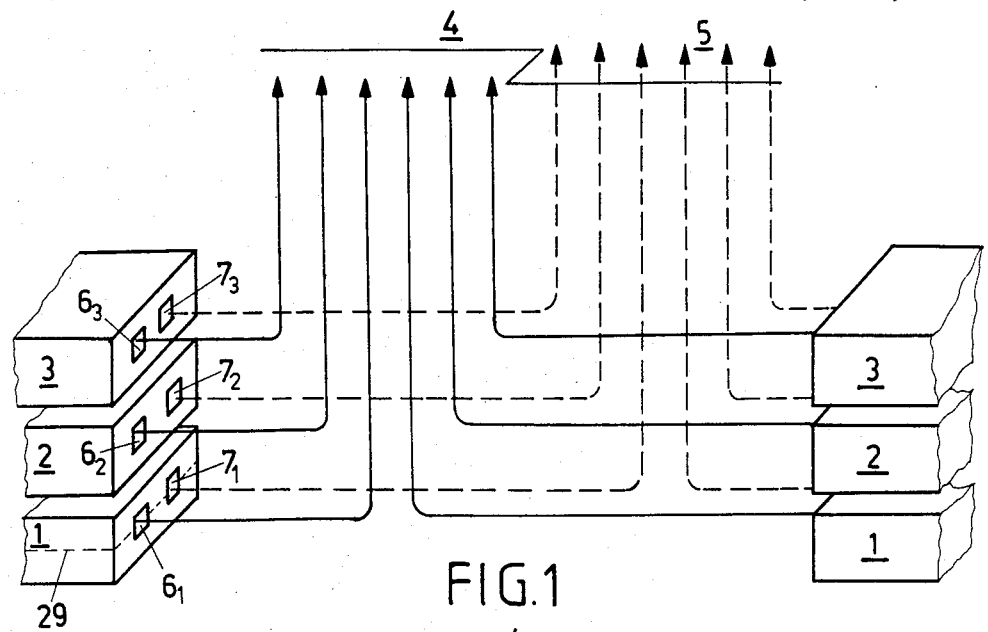
FIG. 1 is a diagrammatic representation explaining the principle of the axially offset gas outlet on which the invention is based.

FIG. 1 shows three rotor winding conductors 1, 2 and 3 which, for reasons of clear representation, are interrupted in the center of the rotor in the zone of the gas outlet 4 and 5. The conductors 1, 2, 3 each have two longitudinal ducts $6_1$, $7_1$, $6_2$, $7_2$, $6_3$, $7_3$ which lead to the two ends of the rotor. The flow of the cooling gas through the ducts 6 is shown by full lines and arrows and those through the ducts 7 by dotted lines and arrows. The gas outlets 4 and 5 are offset in the conductor longitudinal direction in such a way that both gas outlets are in immediate sequence. It may be clearly seen that in the region of the gas outlet 4, one half of the conductor is directly subject to the cooling gas and that, in this way, the other half is also cooled. The same applies vice versa for the region of the gas outlet 5.

Figure 2:
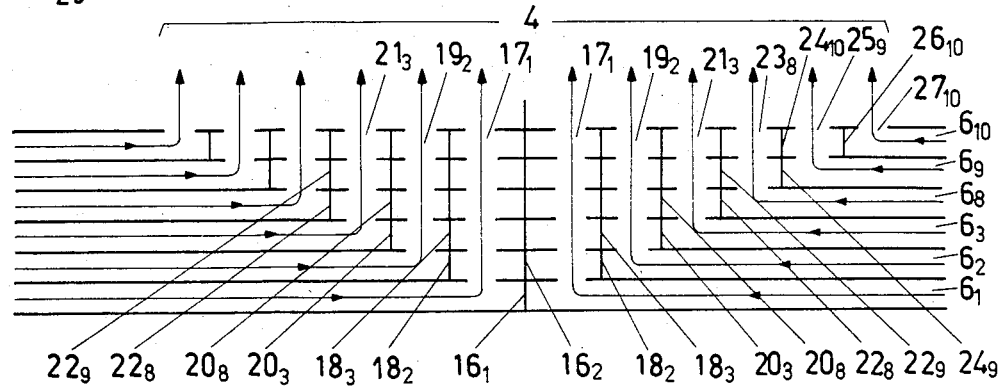
FIG. 2 is a diagrammatic representation of the gas outlet part in one half of the rotor conductor bundle.

In the diagrammatic representation of FIG. 2, only the cooling ducts $6_i$ (i=1, 2, 3, 8, 9, 10) of the rotor winding conductors 1, 2, 3, 8, 9, 10 are shown for reasons of clarity. First separating walls $16_1$, $16_2$ etc. are provided in all the cooling ducts in the center of the gas outlet 4. Provided on both sides of the separating wall $16_i$ located in a radial plane are two first radial ducts $17_1$, which lead through the recesses in the winding conductors 2, 3, 8, 9 and 10 to the cooling duct $6_1$ in the lowest winding conductor 1. These radial ducts are closed against the rest of the cooling ducts $6_2$, $6_3$, ... by second separating walls $18_2$, $18_3$, ... . The second separating walls $18_2$, $18_3$, ... in turn form the boundary for two second radial cooling ducts $19_2$, which are in free connection with the cooling ducts $6_2$ in the second winding conductor 2. The second radial cooling ducts $18_2$ are closed by third separating walls $20_3$, $20_8$, ... towards the ends of the rotor.

The third separating walls $20_3$, $20_8$, ... form the boundary for two third radial ducts $21_3$, which are connected to cooling ducts $6_3$ in the third winding conductor 3. Towards the ends of the rotor, the third radial cooling ducts $21_3$ are closed by fourth separating walls $22_8$, $22_9$, $22_{10}$.

This is continued in an analogous manner through fourth radial cooling ducts $23_8$, which are bounded by the fourth separating walls $22_8$, $22_9$, $22_{10}$ and fifth separating walls $24_9$, $24_{10}$, which are in connection with the cooling duct $6_8$ in the fourth winding duct 8, via fifth radial ducts $25_9$, which are bounded by the fifth separating walls $24_9$, $24_{10}$ and the sixth separating walls $26_{10}$, and finally via the cooling duct $6_{10}$, closed by the separating walls $26_{10}$, in the sixth winding conductor 10, which enters directly into a sixth radial duct $27_{10}$.

All the radial cooling ducts $17_1$, $19_2$, $21_3$, $23_8$, $25_9$ and $27_{10}$ also penetrate a groove wedge, not shown in FIG. 2, together with the wedge backing and enter the air gap of the electrical machine.

The cooling gas system described above can be effected in a surprisingly simple and economic manner in the case of rotors with hollow conductors having a rectangular profile and rectangular shaped cooling duct cross-section, which will be explained in more detail below using FIG. 3.

Figure 3:
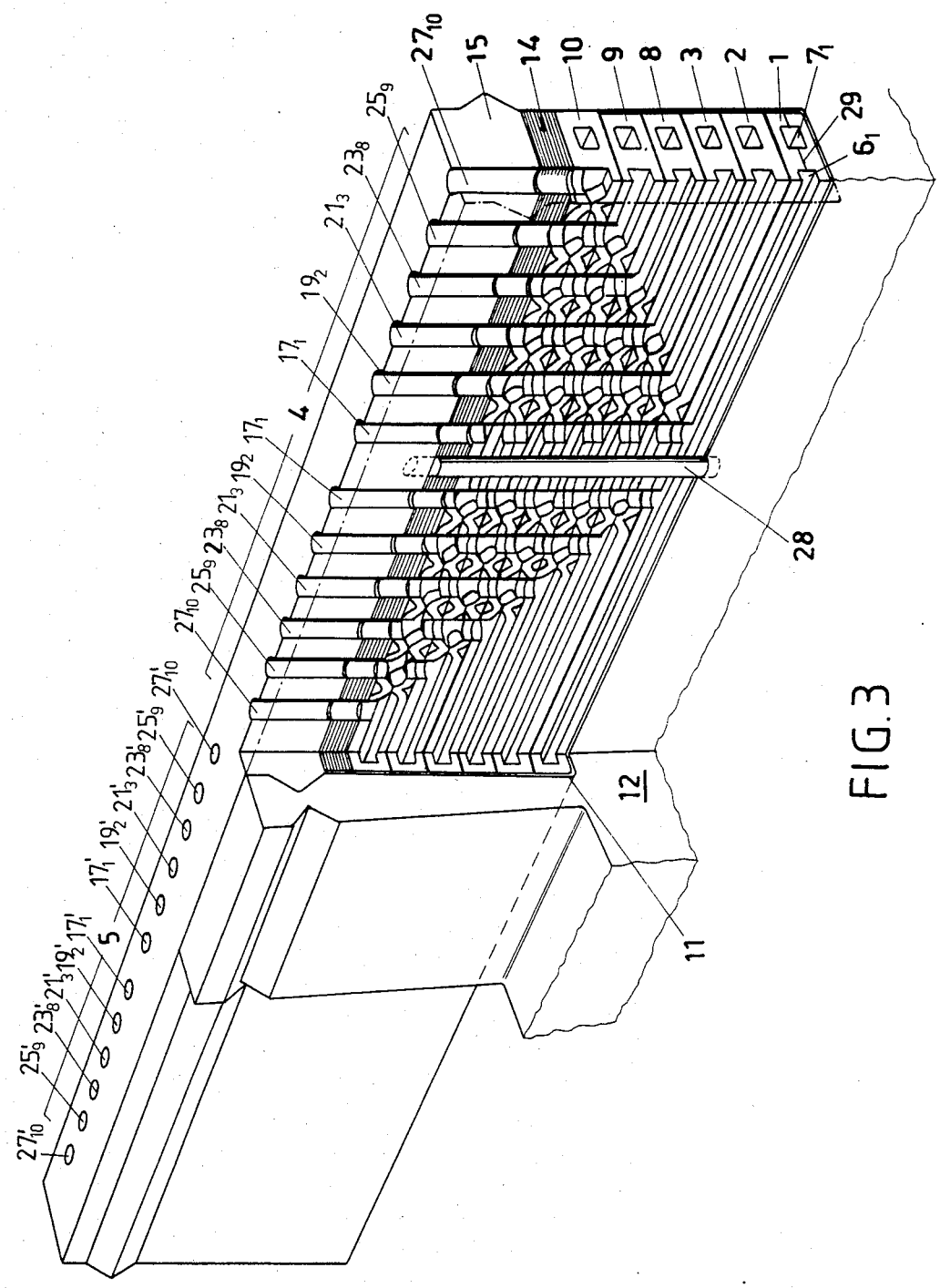
FIG. 3 is a perspective view of a part of a rotor with a directly cooled rotor winding and offset gas outlets.

In the perspective view of the rotor central region of a rotor of a turbo-generator shown in FIG. 3, six rotor winding conductors 1, 2, 3, 8, 9, 10 are located in a vertical row in grooves 11 of rectangular cross-section in the rotor packet 12. Each conductor is provided with an insulation (not shown). The conductor bundle is fixed in known manner by means of a groove wedge 15 in the rotor groove 11 with a wedge backing 14 in molded laminate being inserted between. Each winding conductor 1, 2, 3, 8, 9, 10 has two adjacent cooling ducts $6_i$, $7_i$ (i=1, 2, 3, 8, 9, 10) of rectangular cross-section.

The gas outlet part of one half conductor bundle is indicated by 4 and that of the other half conductor bundle by 5.

A pin 28 made of insulating material and having a diameter greater than the width of the cooling ducts $6_i$ is led through a hole penetrating all the winding conductors 1, 2, 3, 8, 9, 10. This pin 28 undertakes the function of the first separating walls $16_i$ of FIG. 2.

In the form shown, the pin 28 is used as an assembly aid and for centering the winding conductor itself during operation of the machine. It can also, however, be used for centering the conductor assembly in the axial direction if—as shown dotted in FIG. 3—the pin extends into a hole in the bottom of the groove, on the one hand and into a corresponding hole in the groove wedge 15, on the other.

The first radial ducts $17_1$ are formed by mutually aligned holes in the conductor 1, 2, 3, 8, 9 and 10 and in the wedge backing 14 and the groove wedge 15, the hole in the conductor 1 only cutting into the cooling duct $6_1$.

The second separating walls $18_i$ are formed by complete constriction of the cooling ducts $6_2$, $6_3$, $6_8$, $6_9$, 6 directly adjacent to the holes mentioned in the conductors 2, 3, 8, 9 and 10. This construction can, for example, be made by means of a stamping tool, the opposite walls of the cooling duct being so strongly loaded locally that they are sheared inwards in this region and the resulting crimps are in contact over the total width of the cooling duct and block the cooling duct.

Continuing from these constrictions are the radial cooling ducts $19_2$, which are formed by a hole penetrating the conductors 2, 3, 8, 9, 10, the wedge backing 14 and the groove wedge 15. Here again, this hole only cuts into the cooling duct $6_2$ in the conductor 2 without completely penetrating the conductor. The third separating walls $20_i$ are again formed by complete restriction of the cooling ducts $6_3$, $6_8$, $6_9$ and $6_{10}$ immediately adjacent to the holes in the conductors 3, 8, 9 and 10.

Restrictions as separating walls and penetration holes as radial ducts follow in a manner analogous to the arrangement described in FIG. 2.

The gas outlet part 5 has the same construction as that just described; the corresponding radial ducts are indicated by the index "'". Both duct groups are in immediate sequence.

Apart from the single-piece design, the rotor winding conductors can also consist of conductor material with an E-section, as is shown by the split joint 29 in the conductor 1 in FIGS. 1 and 3. This design of the winding conductors has the advantage that the holes in them and hence the cross-sectional shape of the radial ducts $17_1$, $19_2$, ... can be selected more freely. Thus rectangular holes can be economically produced in partial conductors with an E cross-section by stamping. The introduction of the crimps or restrictions acting as separating walls is also simplified in the case of partial conductors with E cross-section.

The separating walls can also be formed by shearing off a part of the cooling duct wall in the shape of a tab by means of a suitable stamping tool acting from the side or from the top or the bottom of the conductor, this tab being bent inwards until it comes into contact with the opposite wall of the cooling duct.

Another possibility for producing separating walls consists, for example, in pushing filling pieces from the free ends of the winding conductors as far as the installation location with subsequent fixing, for example by plastic deformation using a center punch. These filling pieces can also consist of a deformable material which later hardens, for example plugs impregnated with synthetic resin.

A further possibility is to slot the winding conductor at the separating point from the side or from above or from underneath and to insert a separating piece, which closes off the cooling duct, in the slot.

In this connection, it is obvious that the previously described alternatives can be used for either single-piece winding conductors or two-piece conductors of E-section because these manipulations have already been carried out during the manufacture of the winding conductors outside the rotor.

In the case of single-piece winding conductors, there is a further possibility of manufacturing the separating walls by introducing blind holes from the side, pins being screwed or inserted into these holes in order to fill the total cooling duct cross-section.

Figure 4:
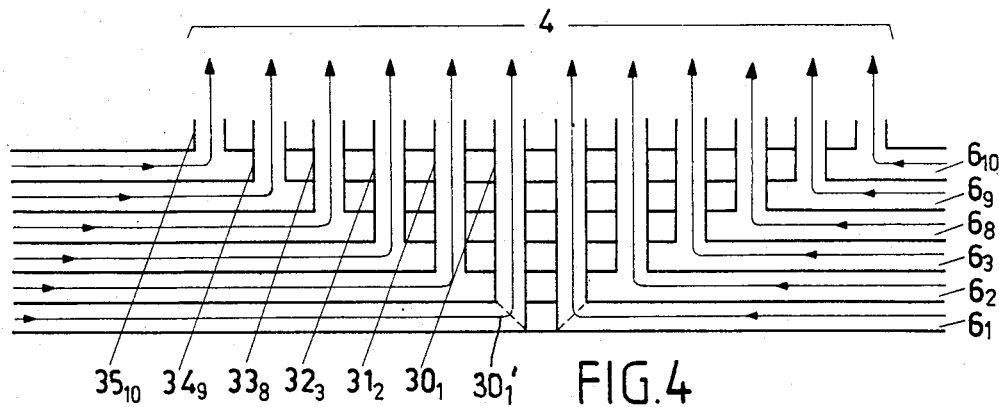
FIG. 4 is a diagrammatic representation of a variation of the arrangement of FIG. 2 with insulating tubes as the radial ducts.

A further embodiment form for the gas outlet 4 is shown diagrammatically in FIG. 4. The separation of the cooling ducts in the axial direction and the formation of the radial ducts is here combined in a single component.

In an analogous manner to FIGS. 2 and 3, in the embodiment shown in FIG. 4 the conductor bundle is provided with a series of through holes which—starting in the center of the gas outlet 4—connect all the winding conductors located in a vertical row in series with the outside of the rotor (air gap). Insulating tubes $30_1$, $31_2$, $32_3$, $33_8$, $34_9$, $35_{10}$ of matching length are inserted in these holes.

The insulating tubes $30_1$ reach as far as the cooling duct $6_1$. Their chamfered ends separate the cooling duct $6_1$ on both sides of the center of the gas outlet 4. The next insulating tubes 31 enter into the cooling duct $6_2$, the insulating tube $30_1$ closing the two halves of the cooling duct $6_2$ towards the center. This repeats in a similar manner as far as the insulating tube $35_{10}$.

The insulating tubes $30_1$, $31_2$, . . . forming the radial ducts have an inner diameter which corresponds approximately to the width of the cooling ducts $6_1$, $6_2$, . . . . The winding conductors 1, 2, . . . are, in this embodiment, advantageous constructed from part conductors of E cross-section. In this way, the cross-sectional shape of the holes can be easily matched to the desired cross-section of the insulating tubes, for example rectangular cross-section.

The insulating tubes $30_1$, $31_2$, . . . preferably penetrate the wedge backing 14 and, in the limiting case, extend as far as the groove wedge 15 which, as in FIG. 3, has holes aligned with the insulating tubes, the insulating tubes being supported on the groove wedge.

The gas outlet 5 is arranged in the same manner. The gas outlets 4, 5 are also offset relative to one another in the longitudinal direction of the conductors.

The following advantages are provided by the axial offset of the gas outlet parts in accordance with the invention.

The sections of the rotor conductors not directly cooled share the cooling provided by the gas flow in the neighboring half conductor.

In addition, the gas flow in the radial cooling ducts also contributes to the direct cooling of the conductor sections in the outlet part since, particularly in FIG. 3, there are practically no dead zones (space between the restrictions and the holes).

The embodiment in accordance with FIG. 4 with insulating tubes as the radial ducts can only be achieved at all by means of axially offset gas outlets because otherwise the dead zones would cause an excessive increase in temperature.

The groove closing wedge is weakened to a much smaller extent because the outlets of the radial ducts are distributed over an axial length which is twice as large as that in the known types and are outside the wedge supports on the groove teeth.

The rotor winding conductors can be manufactured as section conductors of E-section, which makes them easier to deal with and to manufacture.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rotor of an electrical machine having a directly cooled rotor winding, comprising:

plural winding conductors forming a conductor bundle and located one above the other in a groove, the conductors of each bundle including an uppermost conductor beneath which the other conductors of the respective bundle are located, the conductors of each bundle fastened in said groove by means of a groove wedge, the winding conductors each having at least two adjacent half cooling ducts running in a longitudinal direction of the conductors;

at least two gas outlets provided in a central section of the bundle and offset relative to one another in a rotor peripheral direction;

separating means provided in the central section for interrupting the half cooling ducts at plural interruption points;

at each interruption point, each half cooling duct being in connection with a respective approximately radially extending duct which ends at an upper surface of the rotor;

the gas outlets of a conductor bundle being offset relative to one another in the conductor longitudinal direction, and the radial ducts emerging into holes passing approximately radially through the groove wedges;

wherein the radially extending duct associated with each conductor, except the uppermost conductor, extends completely through the winding conductors located above the respective conductor.

2. A rotor according to claim 1, wherein the gas outlets follow directly in the conductor longitudinal direction.

3. A rotor according to claims 1 or 2, wherein the holes in the groove wedge are provided in a central region of the groove wedge.

4. A rotor according to claim 1, wherein said radially extending ducts comprise:
   insulating tubes which extend outwards as far as the groove wedge and which define insulating tube walls limiting the above located cooling ducts of each bundle in the axial direction, thereby forming the separating means.

5. A rotor according to claim 1, wherein:
   the radially extending ducts comprise holes or penetrations in the winding conductors; and
   the separating means comprise closure pieces filling the total cross-section of the cooling ducts.

6. A rotor according to claim 1, wherein:
   the radially extending ducts comprise holes or penetrations in the winding conductors; and
   the separating means comprise respective complete restrictions of the cooling ducts directly adjacent to said holes or penetrations, which restrictions limit flow in the cooling ducts in the axial direction.

* * * * *